United States Patent [19]

Thioux

[11] Patent Number: 4,729,288

[45] Date of Patent: Mar. 8, 1988

[54] VACUUM SERVOMOTOR FOR ASSISTED BRAKING

[75] Inventor: Alain Thioux, Chennevieres, France

[73] Assignee: Bendix France, Drancy, France

[21] Appl. No.: 897,948

[22] Filed: Aug. 19, 1986

[30] Foreign Application Priority Data

Sep. 19, 1985 [FR] France ................ 85 13905

[51] Int. Cl.⁴ .............................................. F15B 9/10
[52] U.S. Cl. ................................. 91/376 R; 91/369 A
[58] Field of Search .............. 91/369 A, 369 B, 369 C, 91/376 R; 60/547.1; 137/627.5

[56] References Cited

U.S. PATENT DOCUMENTS

| 2,735,268 | 2/1956 | Stelzer | 60/547.1 X |
| 2,862,366 | 12/1958 | Ingres et al. | 91/376 R X |
| 3,093,119 | 6/1963 | Stelzer | 121/38 |
| 3,387,455 | 6/1968 | Eggstein | 91/376 R X |
| 4,286,501 | 7/1981 | Thomas et al. | 91/376 R |

FOREIGN PATENT DOCUMENTS 153238 8/1985 European Pat. Off. .......... 91/376 R

Primary Examiner—Robert E. Garrett
Assistant Examiner—Mark A. Williamson
Attorney, Agent, or Firm—Larry J. Palguta; Ken C. Decker

[57] ABSTRACT

The tubular part (9) of the hub (7) of the piston assembly (5), which encloses the distribution valve (8), supports an assembly (200) consisting of a guiding ring (21) and a seal (20) cooperating with the internal wall of a tubular part (22) mounted, for example crimped, inside a central duct (23) of the rear shell (2) of the servomotor housing (1) and having a first end part (26) extending so as to project axially into the rear working chamber (4) of the servomotor. Advantageously, the tubular part (22) has a second end part (37) forming a stop (36) for a limit member (31) associated with input rod (12) and forming a bearing for the return spring (30) of the input rod (12).

7 Claims, 1 Drawing Figure

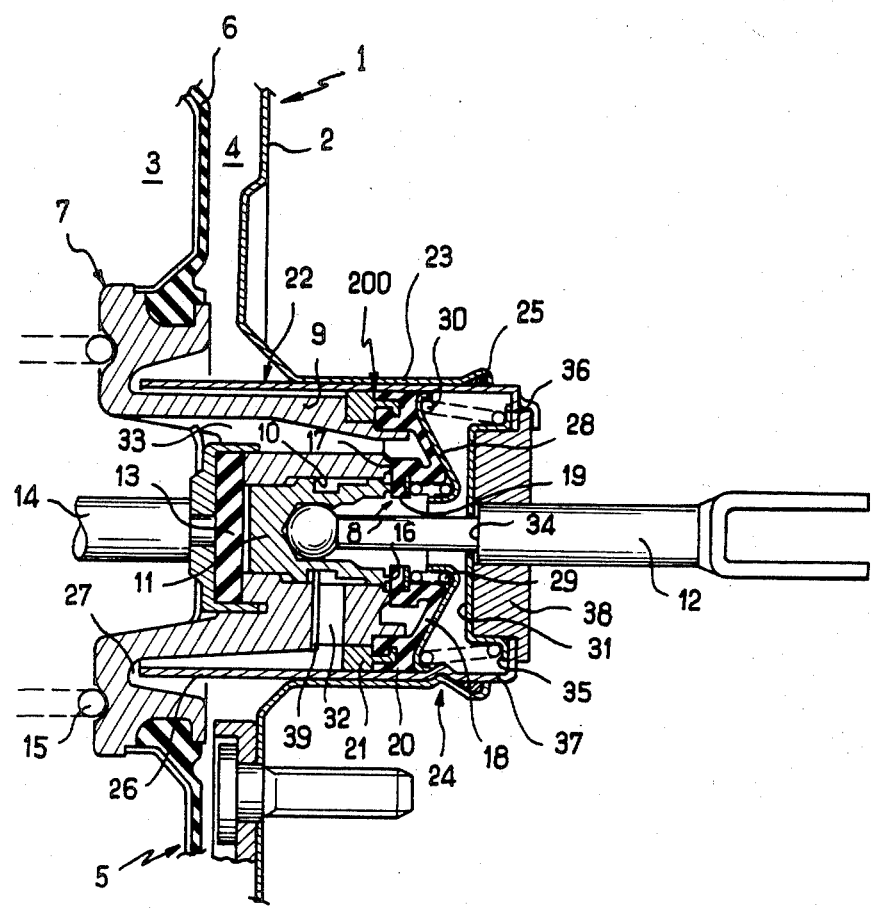

VACUUM SERVOMOTOR FOR ASSISTED BRAKING

The present invention relates to vacuum servomotors for assisted braking, intended more particularly for motor vehicles, of the type comprising, inside a housing, a piston assembly dividing internally the housing into a vacuum chamber, or front chamber, and a working chamber, or rear chamber, and having a tubular piston hub enclosing a distribution valve means actuatable by an input rod of the servomotor, the piston hub being sealingly and slidingly guided inside a tubular structure integral with the housing, by an assembly consisting of a guiding ring and a sliding seal isolating the working chamber from the atmosphere.

A servomotor of this type is described in the documents U.S. Pat. No. 4,453,380 and EP-A-No. 0,158,552, both in the name of the Applicant. In the servomotors described in these documents, the assembly consisting of the guiding ring and sliding seal is mounted conventionally in a tubular end position of the rear shell of the servomotor housing and co-operates with the external surface of the rear part of the piston hub which, consequently, must be manufactured with precision and which projects by a relatively large amount towards the rear of the servomotor housing in accordance with an arrangement requiring large overall dimensions for the servomotor and additional protection, generally in the form of bellows, for the external sliding zone of the rear part of the servomotor hub.

One object of the present invention is to propose a servomotor of the abovementioned type, which has low manufacturing and assembly costs and a compact configuration and which is capable of being adapted in numerous ways.

To this end, according to a feature of the invention, the assembly consisting of the guiding ring and of the sliding seal is mounted on the piston hub, and the tubular structure, which consists advantageously of a tubular part mounted in sealed fashion inside a central tubular position of the housing, has a first end part extending axially so as to protrude into the working chamber.

With this arrangement, the sliding surface, which is provided on the tubular structure, is entirely integrated inside the servomotor, thereby also avoiding having to resort to additional specific protection means, and the piston hub, which is shortened, may be manufactured, at least externally, with a smaller degree of precision.

The abovementioned document EP-A-No. 0,158,552 describes a servomotor arrangement with zero dead travel in which a limit member, which is associated with the input rod, bears against a fixed stop integral with the housing and consisting typically of a cap mounted on the tubular position of the rear shell of the latter.

The arrangement according to the invention, as defined above, may be easily and suitably adapted to this arrangement consisting of a servomotor with zero dead travel.

Another object of the present invention is to propose a servomotor of the abovementioned type designed so as to have zero dead travel, the piston structure and the valve means automatically assuming self-adapting rest positions relative to one another.

For this purpose, according to another feature of the invention, the tubular structure has a second end part which is located opposite the first end part and forms a stop for a limit member associated with the input rod.

Other features and advantages of the present invention will emerge from the following description of an embodiment provided by way of illustration but in no way limiting, given with reference to the attached drawing in which:

FIG. 1 is a view, in partial longitudinal section, of a servomotor for assisted braking according to the invention.

The vacuum servomotor for assisted braking according to the invention comprises typically a housing, indicated generally by the reference 1, consisting of a sealed peripheral assembly comprising a front housing shell (not shown) and a rear housing shell 2, the middle part of which can be seen in the Figure. The housing 1 is divided internally into a front chamber or vacuum chamber 3 intended to be connected to a vacuum source, for example the inlet manifold of a motor-vehicle engine, and a rear chamber or working chamber 4, by a piston structure indicated generally by the reference 5 and consisting of an annular diaphragm assembly 6 clamped peripherally between the two shells of the housing and mounted centrally on a piston hub indicated generally by the reference 7 and enclosing a distribution valve means indicated generally by the reference 8, as will be seen below. The hub 7 has a rear part with a tubular configuration 9 comprising a central bore 10 inside which is slidingly mounted a valve plunger 11 coupled to the end of an input rod 12 intended typically to be connected to a brake pedal of a vehicle (not shown), the hub 7 also supporting, with the interposition of an elastic reaction disc 13, an output rod 14 intended to be coupled to a piston of a master cylinder (not shown) associated with the servomotor for assisted braking, the hub 7 being pushed in the direction of the rear shell 2 of the housing 1 by a spring 15 arranged in the front vacuum chamber 3 of the servomotor. The rear end of the plunger 11 forms a first valve seat 16, a second valve seat 17 being formed in the central part of the hub 9 concentrically around the first valve seat 16. The valve means 8 comprises a valve member 18 made of elastomeric material and having a strengthened central active part 19 arranged so as to cooperate selectively with the valve seats 16 and 17. This active valve part 19 is connected, via a web part extending obliquely outwards, to a valve mounting part in the form of a peripheral flange 20.

According to the invention, the valve mounting part 20 is associated, in a mutually engaging arrangement, with a rigid guiding ring 21, the latter and the flange which forms the part 20 for mounting the valve 18 being mounted in a peripheral stepped seating formed at the free rear end of the tubular part 9 of the hub 7 so as to form a guiding and sealing assembly 200 having an annular peripheral zone intended to co-operate in sealing sliding engagement with the inner wall of an axial tubular part 22 mounted in a short rear central tubular position 23 extending outwards from the rear shell 2 of the housing 1. As can be seen in the Figure, the tubular part 22, which has a constant internal diameter, is rigidly fixed in the required position to the tubular position 23, by crimping, as indicated at 24, a seal 25 being interposed between the rear end of the tubular position 23 and the tubular part 22. The latter is positioned inside the tubular position 23 so as to have a first end part 26 extending axially inwardly of the housing 1 inside the rear working chamber 4 in the direction towards the front part of the hub 7 which is advantageously formed with an annular recess 27 so as not to interfere with the internal end of the first end part 26 of the tubular part 22, the axial dimension of which is determined as a function of the nominal travel of the piston assembly 5. Associated with the valve member 18 there is a sheet-metal support 28 with an S-shaped cross-section and an internal rounded part forming a bearing for a spring 29 pushing the active part 19 of the valve member 18 in the direction of the valve seats 16 and 17 and an external rounded part forming a bearing for a rod return spring 30 also bearing against a collar means 31 associated with the input rod 12, the force of the return spring 30 ensuring that the assembly 200 is kept in position inside the stepped seating of the tubular part 9 of the hub 7. It will be understood that, in a conventional manner, the active part 19 of the valve member 18 controls, depending on its co-operation with the seat$ 16 and 17, fluid communication, via a radial passage 32 inside the tubular part 9 of the hub 7, between the rear working chamber 4 and the atmosphere or, via a longitudinal air passage 33 inside the hub 7, with the front vacuum chamber 3.

In the arrangement described above, the collar means 31 may be rigidly fixed to the rod 12. However, in a preferred embodiment of the invention, as shown and in accordance with the teaching of the abovementioned document EP-A-No. 0 158 552, the contents of which are assumed to be incorporated herein for reference, the collar means 31 is slidingly mounted on the rod 12 while being capable, however, of co-operating centrally with a shoulder 34 directed towards the front of the rod 12 and, peripherally, via an annular edge 35, with a fixed stop integral with the housing 1. According to a feature of the invention, this fixed stop consists of a flange or fingers 36, folded down radially inwards, forming part of a second end part 37 of the tubular part 22 extending axially so as to project slightly outside the tubular position 23, operation of the servomotor according to this arrangement therefore being identical in all aspects to that described in the abovementioned document EP-A-No. 0,158,552. In order to reduce further the overall axial dimensions of the servomotor, the external annular edge 35 of the collar means 31 is axially offset towards the outside of the main central covering zone of the collar means 31 intended to co-operate with the shoulder 34 of the rod 12, the collar means 31 receiving, in addition, at least one part of an annular air filter 38 through which the input rod 12 passes and which is mounted on the end part 37 of the tubular part. So as to ensure increased strength during so-called "tear" tests, a key 39 may be mounted inside the radial air passage 32 so as to co-operate with a peripheral shoulder of the plunger 11. Although the present invention has been described in relation to a particular embodiment, it is not limited thereby, but on the contrary, may be subject to modifications and variations deemed necessary by a person skilled in the art.

I claim:

1. A servomotor for assisted braking, comprising, inside a housing, a piston assembly dividing the housing internally into a vacuum chamber and a working chamber and comprising a tubular piston hub enclosing distribution valve means actuable by an input rod, the tubular hub being sealingly and slidingly guided, inside a tubular structure connected fixedly with the housing, by an assembly comprising a guiding ring and a sliding seal which isolate the working chamber from atmosphere, characterized in that the assembly comprising the guiding ring and sliding seal is mounted on the tubular hub and the tubular structure having a first end part extending so as to project into the working chamber, the tubular structure comprising a tubular part mounted in sealed fashion inside a central tubular portion of the housing, the tubular part and the tubular portion fixed rigidly to each other by crimping, and the assembly comprising the guiding ring and sliding seal being mounted on a free end of the tubular hub.

2. The servomotor according to claim 1, characterized in that the distribution valve means comprises an elastic valve member cooperating selectively with two concentric valve seats formed in the tubular hub and on a valve plunger coupled to the input rod, respectively, the sliding seal being formed by an annular external end of the valve member.

3. The servomotor according to claim 2, characterized in that the tubular structure has a second end part located opposite the first end part and forming a stop for a limit member associated with the input rod.

4. The servomotor according to claim 3, characterized in that the second end part is formed by an end of the tubular part extending outwardly of the central tubular portion of the housing.

5. The servomotor according to claim 4, characterized in that the limit member is mounted slidingly on the input rod and is capable of engaging selectively with a shoulder of the input rod.

6. The servomotor according to claim 5, characterized in that the limit member forms a bearing for a return spring of the input rod, the return spring also bearing against the assembly comprising the guiding ring and sliding seal.

7. The servomotor according to claim 6, characterized in that the return spring also bears against a profiled support associated with the valve member of the distribution valve means.

* * * * *